United States Patent [19]
Kroll et al.

[11] Patent Number: 6,145,645
[45] Date of Patent: Nov. 14, 2000

[54] DISK ASSEMBLY

[75] Inventors: Jurgen Kroll, Ketsch; Norbert Bastel, Oberhausen-Rheinhausen, both of Germany

[73] Assignee: Borg-Warner Automotive, GmbH, Germany

[21] Appl. No.: 09/323,191

[22] Filed: Jun. 1, 1999

[30] Foreign Application Priority Data

Jul. 4, 1998 [DE] Germany .......................... 198 30 049

[51] Int. Cl.⁷ .................................................. F16D 13/60
[52] U.S. Cl. .................................. 192/113.36; 192/70.12; 192/107 R
[58] Field of Search ........................... 192/113.36, 70.12, 192/107 R, 3.29

[56] References Cited

U.S. PATENT DOCUMENTS 5,669,474  9/1997  Dehrmann et al. .................... 192/3.29
5,782,327  7/1998  Otto et al. ............................. 192/3.29
5,979,621  11/1999  Schoder .................................. 192/3.29

FOREIGN PATENT DOCUMENTS 2 316 153  2/1998  United Kingdom .

Primary Examiner—Rodney H. Bonck
Assistant Examiner—Tisha D. Waddell
Attorney, Agent, or Firm—Emch, Schaffer, Schaub, & Porcello L.P.A.; Greg Dziegielewski

[57] ABSTRACT

A disk assembly having a circular friction lining mounted on one or both sides of a support member. An oil channel extends from the outer edge of the friction lining to the inner edge. The oil channel includes an enlarged middle oil reservoir section extending completely through the friction lining. An inlet section and an outlet section of the oil channel are in communication with the reservoir section and are narrow grooves which are embossed in the friction lining during bonding of the friction lining.

4 Claims, 2 Drawing Sheets

DISK ASSEMBLY

BACKGROUND OF THE INVENTION

Disk assemblies are well known in the art and are often used in for example, clutch assemblies.

One type of disk assembly is a wet-running friction clutch disk assembly which includes a support and an annular friction lining applied to the support. At least one channel is formed as an oil guide with the channel extending from the outer edge to the inner edge of the friction lining. This type of clutch disk assembly for a vehicle clutch is well known in the art. Often, the grooves are embossed in the friction lining for defining the oil guiding channels.

The oil passing through such grooves serve to cool the clutch disk assembly. For efficient cooling, the volume of oil must be sufficient. The time or flow rate of the oil through the grooves must also be sufficient. Therefore, it is desirable to have deep grooves and long grooves. In prior art structures, the groove depth is often up to 50% of the thickness of the friction lining. Often such grooves can not be embossed during the production bonding and pressing of the friction lining. Often, a separate embossing step is required.

SUMMARY OF THE INVENTION

The present invention is directed to an improved disk assembly, for use, for example, in a clutch disk assembly for a wet-running friction clutch, where the manufacture of the assembly is simple and the resulting assembly provides efficient oil cooling.

The improved disk assembly includes a support member having opposed surfaces. A ring shaped friction lining is mounted adjacent at least one of the opposed surfaces. An oil channel is defined in the friction lining. The oil channel includes an oil inlet section formed in the friction lining; a middle section serving as a reservoir, in communication with the inlet section, and an outlet section in communication with the middle section. Preferably, the middle or oil reservoir section extends completely through the friction lining.

The oil inlet and outlet sections are press formed in the friction lining, occupying only one part of the friction lining thickness. The oil inlet section and oil outlet section are preferably embossed in the friction lining. The middle section or oil reservoir section, is as deep as the friction lining is thick. Preferably, the middle section is punched out of the friction lining.

A friction lining may be applied on one or both sides of the support member. When a friction lining is mounted on both sides, it is often used as a clutch plate.

The middle section of the oil channel defined by the friction lining forms a large oil reservoir that ensures a long residual time for the oil as it passes through the channel. Effective cooling is achieved by direct contact with the oil and the metal support member. The oil inlet section and the oil outlet section may be comparatively flat and narrow. It is therefore possible to emboss the inlet and outlet sections during bonding and pressing during the manufacturer of the friction lining. Therefore, the separate embossing step to form the oil grooves is ordinarily not required in the present method as opposed to most prior art oil groove forming methods.

The method of making a clutch assembly, according to the present invention, where the disk assembly has a support member and a ring shaped friction lining includes the steps of punching one or more middle oil reservoir sections through the friction lining. During bonding, the inlet and outlet channels are pressed or embossed in the friction lining and are in communication with the middle section. The friction lining is positioned adjacent and is normally adhered to the side of the ring support.

The clutch disk assembly, according to the present invention, is preferably used in friction clutches having high friction power. As an example, a convertor by-pass clutch, designed for prolonged slip operation can utilize a clutch disk assembly according to the present invention. The clutch disk assembly of the convertor by-pass clutch fulfills the function of an oscillation damper during the engine shaft and gear input shaft when the convertor is by-passed during its slip. Another example of a preferred use of a clutch disk assembly according to the present invention is in a starting clutch which is designed for longer slip operation with a high torque transfer.

DESCRIPTION OF THE PREFERRED EMBODIMENT

Figure 1:
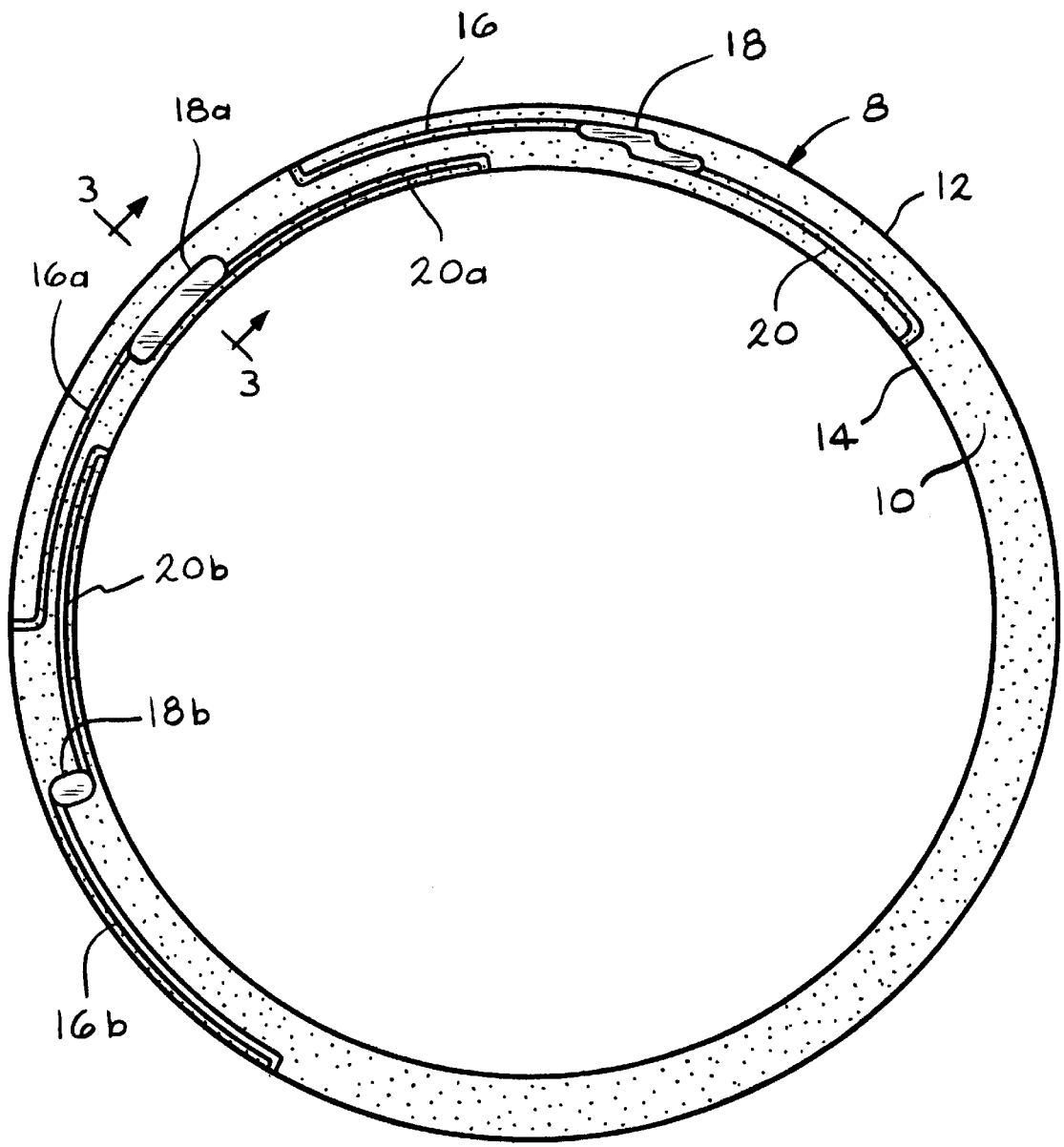
FIG. 1 is a plan view of a disk assembly, according to the present invention, with a plurality of oil channel configurations being shown on a single friction lining, for illustrative purposes.
Figure 2:
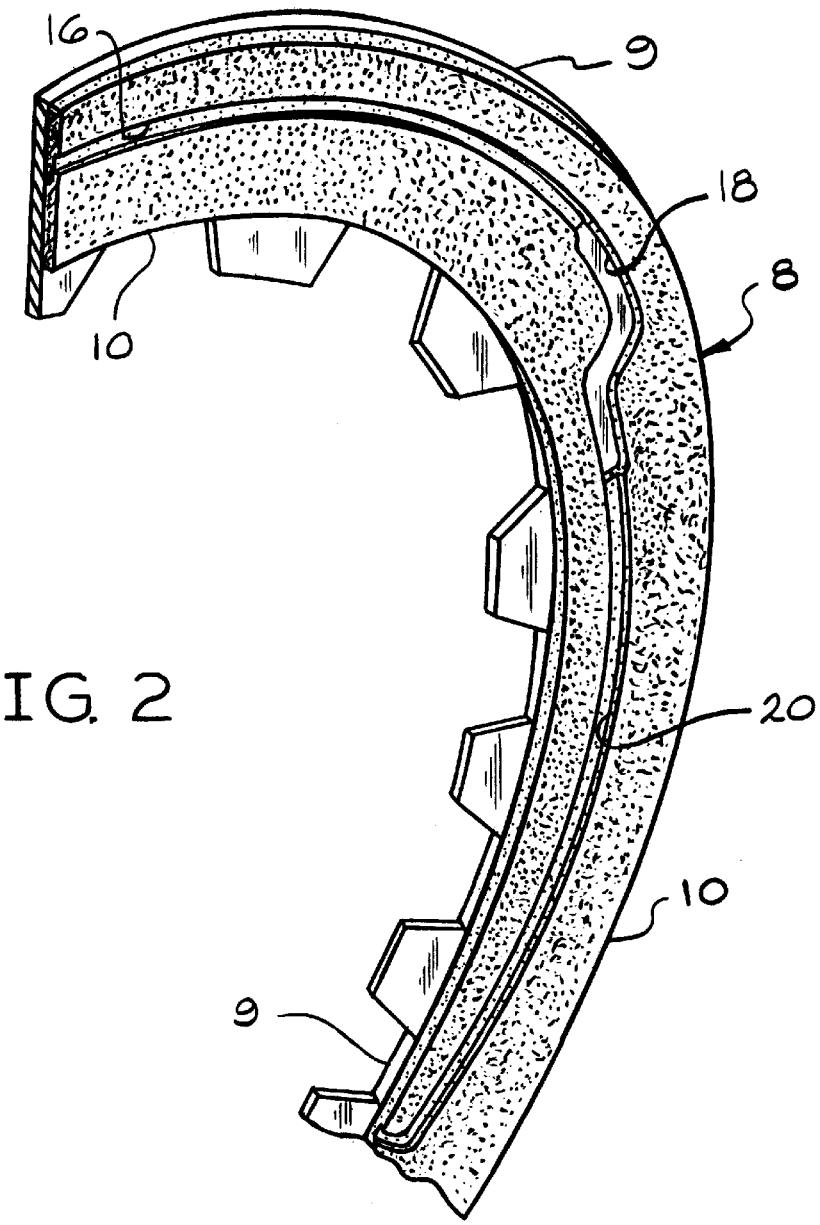
FIG. 2 is an enlarged fragmentary perspective view of the disk assembly shown in FIG. 1.

An improved disk assembly, according to the present invention, is generally indicated by the reference number 8. The disk assembly 8 includes a support member 9 and a ring shaped friction lining 10. The friction lining 10 is normally a circular ring made of a paper-like flat material, as is well known in the prior art. An oil channel system for guiding oil extends over somewhat less than the periphery of one quadrant of the ring shaped friction lining 10 from an outer edge 12 to an inner edge 14. The oil channel includes an oil inlet section 16, a middle section 18 and an oil outlet section 20. The oil inlet section 16 and the oil outlet section 20 are pressed, preferably by embossing, in the friction lining 10. The channel middle section 18, which serves as an elongated and large oil reservoir is punched through the friction lining 10. The oil inlet sections 16 and the oil outlet sections 20 are narrow grooves having a generally rectangular profile. The oil inlet section 16 begins on the outer edge 12 of the friction lining 10 with a radial inlet opening and then curves 90°. The oil inlet 16 then extends in a peripheral direction close to the outer edge 12 of the friction lining 10 until it is received by the enlarged oil reservoir middle section 18. The channel middle section 18 in the present embodiment, is an elongated offset hole or opening. The form and size of the middle section 18 can vary. The oil outlet section 20 extends from the middle section 18 in a peripheral direction turns 90°, and has a radial outlet to the inner edge.

Referring to FIG. 1, in another embodiment, the middle section 18a is an elongated, generally elliptical hole or opening 18a. The opening 18a extends in a generally peripheral direction. In a still further embodiment a middle section 18b has a hole or opening which is generally elliptical. The opening 18b extends in a generally radial direction.

As shown in FIG. 1, in the first embodiment, the middle section 18 is stepped in a radial direction with an outer part extending radially outwardly in a peripheral direction and a connecting inner part extending radially inward also in a peripheral direction. The inner and outer parts are in communication with one another forming steps that are offset in the peripheral direction. The oil inlet section 16 discharges into the outer part of the middle section 18. The oil outlet section 20 extends peripherally from the inner part of the middle section 18.

Figure 3:
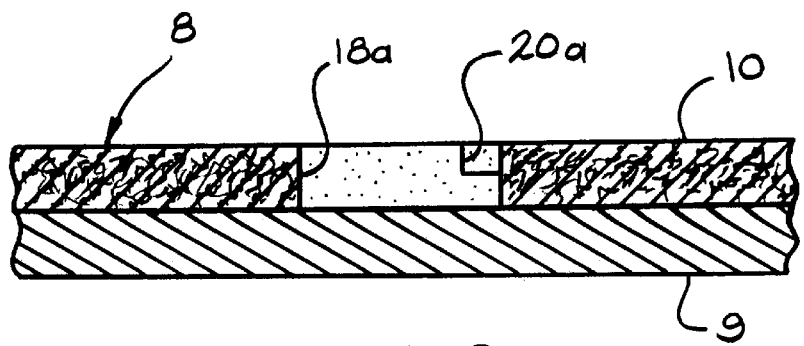
FIG. 3 is an enlarged, fragmentary cross-sectional view taken along the line 3—3 of FIG. 1.

Referring to FIG. 3, the oil inlet section 16 and the oil outlet section 20 are pressed narrow grooves having a rectangular profile. Referring to FIG. 3, the narrow, rectangular, oil outlet section 20*a* receives oil from the oil reservoir defined by the middle section 18*a*.

As shown in FIG. 1, the oil inlet section 16 of one overall oil channel can overlay, for example the oil outlet section 20*a* of a neighboring channel assembly along the periphery of the channel lining and vice versus.

In a method of making a disk assembly 8, having the ring shaped support 9 and the ring shaped friction lining 10, a friction lining 10 is mounted adjacent at least one side of the support 9. Prior to mounting, the oil reservoir or middle section 18, 18*a* or 18*b* is punched through the friction lining 10. During bonding of the friction lining 10, the inlet grooves 16, 16*a* and 16*b* together with the outlet grooves 20, 20*a* and 20*b* are pressed, preferably by embossing into the surface of the friction lining 10.

Further revisions to the embodiments described above may be made without departing from the scope of the following claims.

We claim:

1. An improved disk assembly, comprising a support member having opposed surfaces, a friction lining mounted adjacent at least one of said opposed surfaces, said friction lining having outer and inner edges, an oil channel defined in said friction lining, said oil channel including an oil inlet section formed in said friction lining, and extending from such outer edge, a middle section defining a reservoir in communication with said inlet section, said middle section extending completely through said friction lining, and an outlet section, formed in said friction lining, said inlet section and said outlet section being pressed into but not extending through said friction lining, said outlet section being in communication with said middle section and extending to said inner edge.

2. A disk assembly, according to claim 1, wherein said inlet section and said outlet section are embossed in said friction lining.

3. A disk assembly, according to claim 1, wherein said middle section defines an enlarged oil reservoir which is punched out of said friction lining.

4. A method of making a disk assembly having a support member and a ring shaped friction lining mounted adjacent at least one side of the support, comprising the steps of punching a middle oil reservoir section completely through the friction lining, bonding said friction lining to said support and during bonding embossing inlet and outlet channels in the friction lining, said inlet and said outlet channels not extending completely through said friction lining.

* * * * *